(12) United States Patent
Onouchi et al.

(10) Patent No.: US 8,591,644 B2
(45) Date of Patent: Nov. 26, 2013

(54) LIQUID-CRYSTALLINE COATING FLUID AND POLARIZING FILM

(75) Inventors: Hisanari Onouchi, Ibaraki (JP); Shoichi Matsuda, Ibaraki (JP); Sadahiro Nakanishi, Ibaraki (JP); Tadayuki Kameyama, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/505,592

(22) PCT Filed: Feb. 18, 2010

(86) PCT No.: PCT/JP2010/052398
§ 371 (c)(1),
(2), (4) Date: May 2, 2012

(87) PCT Pub. No.: WO2011/055556
PCT Pub. Date: May 12, 2011

(65) Prior Publication Data
US 2012/0216714 A1    Aug. 30, 2012

(30) Foreign Application Priority Data
Nov. 9, 2009   (JP) ................. 2009-256198

(51) Int. Cl.
*C09D 5/00*      (2006.01)
*G02B 5/30*     (2006.01)

(52) U.S. Cl.
USPC .................................. 106/287.26

(58) Field of Classification Search
None
See application file for complete search history.

(56) References Cited

U.S. PATENT DOCUMENTS

| | | |
|---|---|---|
| 8,158,022 B2 | 4/2012 | Onouchi et al. |
| 2009/0166583 A1 | 7/2009 | Hasegawa et al. |
| 2009/0275742 A1 | 11/2009 | Sano et al. |
| 2010/0038589 A1 | 2/2010 | Matsuda et al. |
| 2010/0039608 A1 | 2/2010 | Matsuda et al. |
| 2012/0105795 A1 | 5/2012 | Matsuda et al. |
| 2012/0180700 A1 | 7/2012 | Suzuki et al. |

FOREIGN PATENT DOCUMENTS

| | | |
|---|---|---|
| CN | 101208622 A | 6/2013 |
| EP | 1906216 | * 4/2008 |
| JP | 2007-126628 | 5/2007 |
| JP | 2009-173849 | 8/2009 |
| JP | 2009-263453 | 11/2009 |
| JP | 2010-26024 | 2/2010 |
| WO | 2009/037911 | 3/2009 |

OTHER PUBLICATIONS

U.S. Appl. No. 13/488,649 to Hisanari Onouchi, filed Jun. 5, 2012.
Yutaka Hosoda, "Theoretical production Dye Chemistry, Riron Seizo Sentyo Kagaku", Fifth Edition, Gihodo Shuppan Co., Ltd.,, Jul. 15, 1968, pp. 138-139, 144.
Search report from International Patent Application No. PCT/JP2010/052398, mail date is Apr. 27, 2010.
Chinese Office Action issued with respect to Chinese Patent Application No. 201020034075 1, mailed Feb. 5, 2013.

* cited by examiner

*Primary Examiner* — Yun Qian

(74) *Attorney, Agent, or Firm* — Greenblum & Bernstein, P.L.C.

(57)    ABSTRACT

A liquid-crystalline coating fluid which comprises: an azo compound represented by the following general formula (1); and a solvent to dissolve the azo compound:

[Chemical formula 1]

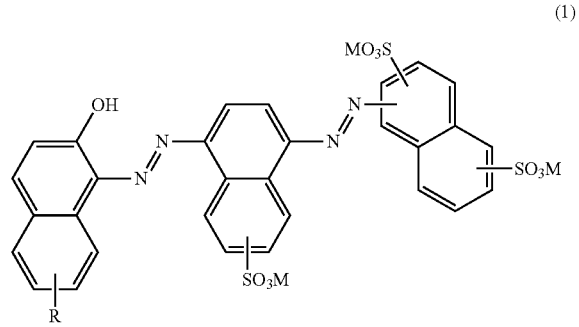

wherein R is an amino group, a cyano group, a hydroxyl group, a nitro group, a halogen group or a hydrogen atom; and M is a counterion.

6 Claims, No Drawings

LIQUID-CRYSTALLINE COATING FLUID AND POLARIZING FILM

FIELD OF THE INVENTION

The present invention relates to a liquid-crystalline coating fluid and a polarizing film made from it.

BACKGROUND OF THE INVENTION

A polarizing plate absorbs linear polarization in an absorption axis direction and allows the linear polarization in a transmission axis direction to pass through. Conventionally, a polarizing plate obtained by dying a resin film, such as a polyvinyl alcohol or the like with iodine or a dichromatic dye and stretching the film in one direction has been widely used. However, there has been a problem that the aforementioned polarizing plate is poor in heat resistance and light resistance depending on the kind of the dye or the resin film. Further, there has been a drawback that the polarizing plate has a relatively great thickness.

In contrast, a method for forming a polarizing film by casting a liquid-crystalline coating fluid containing a liquid-crystalline compound on a substrate, such as a glass plate or a resin film and the like to orient the liquid-crystalline compound is known. A lyotropic liquid-crystalline compound is suitable as a liquid crystalline-compound to be used for this purpose.

The lyotropic liquid-crystalline compound forms supramolecular aggregates exhibiting liquid crystallinity in the solution, so that the long axis direction of the supramolecular aggregates is oriented in a casting direction when casting with the application of a shearing stress to the liquid-crystalline coating fluid containing this.

Lyotropic liquid-crystalline compound-based polarizing films do not need to be stretched and are easy to have a greater width. Further, it is possible to reduce the thickness of the lyotropic liquid-crystalline compound-based polarizing films significantly.

Azo compounds having hydroxyl groups in ortho positions of naphthalene rings coupled to azo groups are known as lyotropic liquid-crystalline compounds suitable for making a polarizing film (JP 2007-126628 A).

The polarizing film obtained by casting a liquid-crystalline coating fluid including such an azo compound exhibits absorption dichroism in a wavelength region having wide visible light. However, the polarizing film may have a low dichroic ratio (e.g., the dichroic ratio is less than 10) depending on the molecular structure of the azo compound.

SUMMARY OF THE INVENTION

A polarizing film obtained by casting a liquid-crystalline coating fluid including an azo compound exhibits absorption dichroism in a wavelength region having wide visible light. However, the polarizing film may have a low dichroic ratio (e.g., the dichroic ratio is less than 10) depending on the molecular structure of the azo compound.

It is an object of the present invention to stably obtain a polarizing film having a high dichroic ratio using a liquid-crystalline coating fluid including a novel azo compound.

The summary of the present invention is described as below.

In a first preferred aspect, a liquid-crystalline coating fluid according to the present invention comprises: an azo compound represented by the following general formula (1); and a solvent to dissolve the azo compound:

[Chemical formula 1]

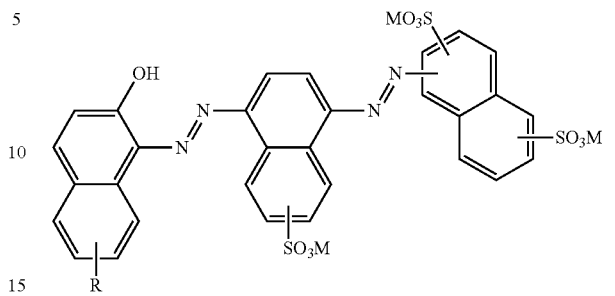

(1)

wherein R is an amino group, a cyano group, a hydroxyl group, a nitro group, a halogen group or a hydrogen atom; and M is a counterion.

In a second preferred aspect, a liquid-crystalline coating fluid according to the present invention comprises: an azo compound represented by the following general formula (2); and a solvent to dissolve the azo compound:

[Chemical formula 2]

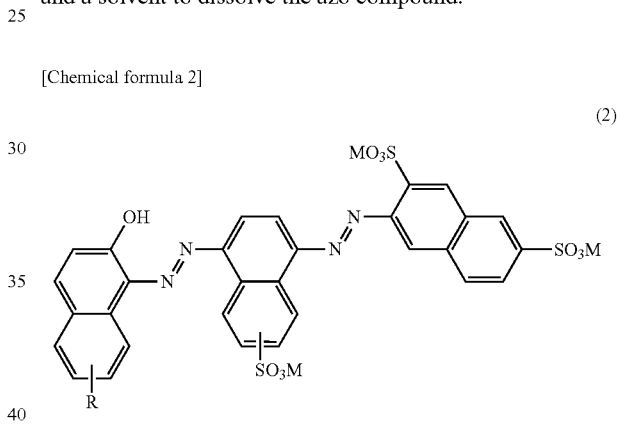

(2)

wherein R is an amino group, a cyano group, a hydroxyl group, a nitro group, a halogen group or a hydrogen atom; and M is a counterion.

In a third preferred aspect, a liquid-crystalline coating fluid according to the present invention comprises: an azo compound represented by the general formula (6); and a solvent to dissolve the azo compound.

[Chemical formula 6]

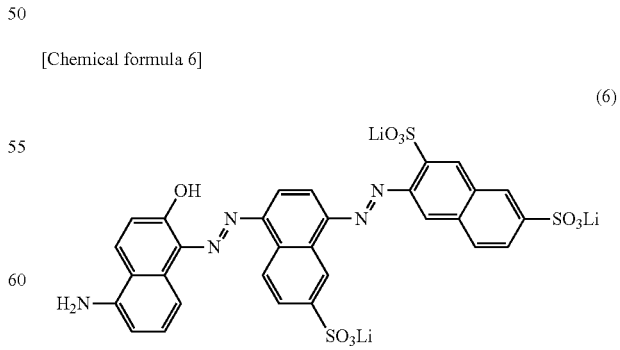

(6)

In a fourth preferred aspect, a polarizing film according to the present invention is obtained by casting the aforementioned liquid-crystalline coating fluid in a thin film state.

ADVANTAGE OF THE INVENTION

Inventors of the present invention synthesized a novel azo compound in which a hydrazone structure was not formed near a sulfonic acid group. A polarizing film manufactured by casting this azo compound stably exhibits a high dichroic ratio.

DESCRIPTION OF THE PREFERRED EMBODIMENTS

Since an azo compound having a hydroxyl group in an ortho-position of a naphthalene ring bonded to an azo group is capable of forming an azo structure represented by the following chemical formula (3) and a hydrazone structure represented by the following chemical formula (4), the azo compound is presumed to exhibit absorption dichroism in a wavelength region with wide visible light:

[Chemical formula 3]

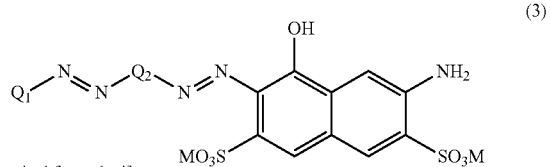

(3)

[Chemical formula 4]

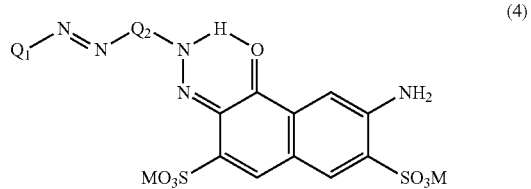

(4)

According to the study of the inventors of the present invention, a conventional azo compound has a hydrazone structure near a bulky sulfonic acid group, which could lead to damage flatness of the hydrazone structure. This decreases the dichroic ratio. Accordingly, a polarizing film manufactured using a conventional azo compound does not have a stable dichroic ratio.

To avoid this, the inventors of the present invention synthesized a novel azo compound in which a hydrazone structure was not formed near a sulfonic acid group. A polarizing film manufactured by using this azo compound stably exhibits a high dichroic ratio.

[Liquid-Crystalline Coating Fluid]

A liquid-crystalline coating fluid of the present invention comprises: an azo compound represented by the following general formula (1); and a solvent to dissolve the azo compound.

[Chemical formula 1]

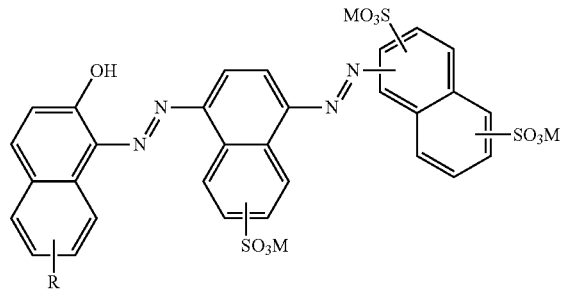

(1)

In the general formula (1), R is an amino group, a cyano group, a hydroxyl group, a nitro group, a halogen group or a hydrogen atom; and M represents a counterion and is preferably a hydrogen atom, an alkaline metal atom, an alkaline-earth metal atom, metal ions or substituted or unsubstituted ammonium ions.

Examples of a metal ion include, for instance, $Na^+$, $Li^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, or $Ce^{3+}$ and the like. When the counterion M is a multivalent ion, a plurality of azo compounds share one multivalent ion (counterion).

In the liquid-crystalline coating fluid, the azo compound forms aggregates in the solution and exhibits a liquid crystal phase. The liquid crystal phase is typically a nematic liquid crystal phase, a hexagonal liquid crystal phase or the like.

The azo compound in the liquid-crystalline coating fluid preferably has a concentration of 0.5% to 50% by weight. The liquid-crystalline coating fluid exhibits a stable liquid crystal phase at least a portion of this concentration range.

The liquid-crystalline coating fluid of the present invention may contain anything including the aforementioned azo compound and a solvent, for instance, the liquid-crystalline coating fluid of the present invention may contain other liquid-crystalline compound or any additives. Examples of the additives include a surfactant, an antioxidant, an antistatic agent and the like. The concentration of the additives is generally less than 10% by weight.

[Azo Compound]

The azo compound to be used in the present invention is a compound represented by the aforementioned general formula (1). The azo compound to be used in the present invention is preferably a compound represented by the general formula (2) mentioned below. In the general formula (2) mentioned below, R and M are the same as those in the aforementioned general formula (1).

[Chemical formula 2]

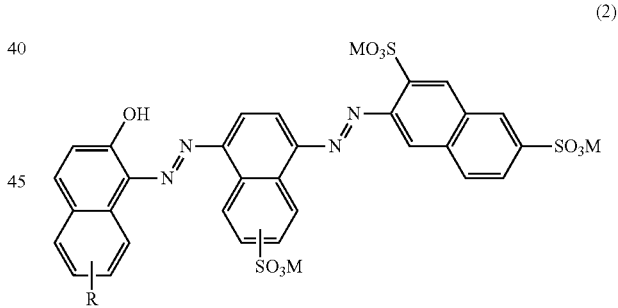

(2)

The azo compound represented by the general formula (1) or (2) forms a hydrazone structure having flatness higher than the conventional ones in a position away from the sulfonic acid group. A polarizing film obtained using this azo compound stably exhibits a high dichroic ratio because the hydrazone structure has high flatness.

As shown in the following reaction formula (5), in accordance with a conventional method, a monoazo compound is obtained by diazotizing and coupling two kinds of compounds typically having an amino group and is further subject to diazotization and coupling reaction with a hydroxyl naphthalene sulfonic acid derivative to obtain an azo compound represented by the general formula (1) or (2). The conventional method is typically described in "Riron Seizou Senryokagaku" Fifth Edition (Theoretical Production Dye Chemistry) Yutaka Hosoda (published on Jul. 15, 1968, GIHODO SHUPPAN Co., Ltd.), pages 135 to 152).

[Chemical formula 5]

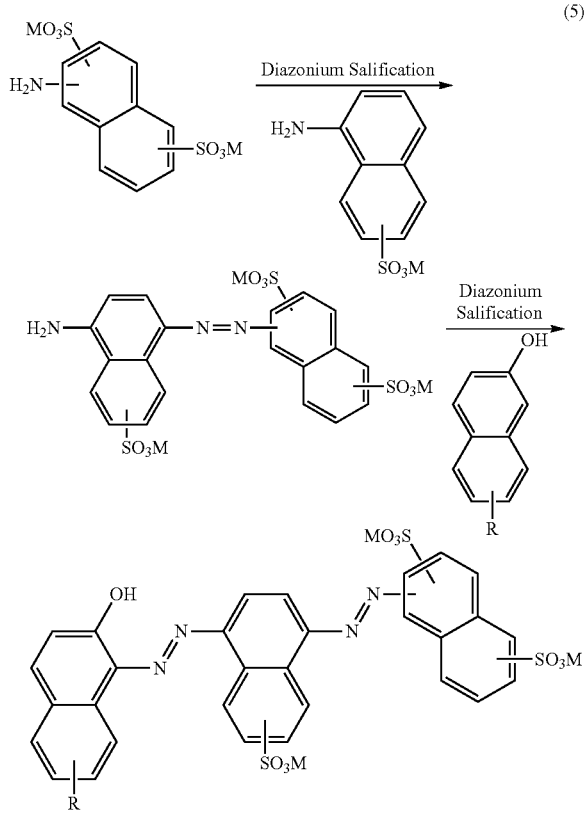

[Solvent]

Solvents to be used in the present invention dissolve the aforementioned azo compounds and hydrophilic solvents are preferably used as solvents. The hydrophilic solvents are preferably water, alcohol kinds, cellosolve kinds and mixture of thereof. Water-soluble compounds, such as glycerin, ethyleneglycol or the like may be added to the solvents. These additives can be used to control readily solubility of the azo compound and the drying rate of the liquid-crystalline coating fluid.

[Polarizing Film]

A polarizing film of the present invention can be obtained by casting the aforementioned liquid-crystalline coating fluid.

The polarizing film of the present invention preferably exhibits absorption dichroism in a visible light region (at a wavelength of 380 nm to 780 nm). Such characteristics are obtained by the orientation of the aforementioned azo compound in the polarizing film.

The aforementioned azo compound forms supramolecular aggregates in the liquid-crystalline coating fluid. Accordingly, the long axis direction of the supramolecular aggregates is oriented in the flowing direction by casting the liquid-crystalline coating fluid while applying a shearing force to the liquid-crystalline coating fluid to flow. In addition to the shearing force, an orientation means may combine orientation treatment, such as rubbing treatment and optical orientation or the like and orientation by a magnetic field and an electric field.

The polarizing film of the present invention preferably has a thickness of 0.1 μm to 5 μm. The polarizing film of the present invention preferably has a dichroic ratio of 10 or higher.

While it is to be understood that the flow casting means of the liquid-crystalline coating fluid is not particularly limited, if only the liquid-crystalline coating fluid is uniformly cast. An appropriate coater is used.

While it is to be understood that a substrate for casting the liquid-crystalline coating fluid of the present invention is not particularly limited, a single layer or a plurality of laminates (for example, including an orientation film) may be used. Examples of the specific substrate include a glass plate and a resin film. Although the thickness of the substrate is not particularly limited except for its application, the thickness is generally in the range between 1 μm to 1,000 μm.

When the substrate includes an orientation film, the orientation film is preferably treated with orientation. Examples of the substrate including an orientation film include a substrate made by coating a polyimide film on a glass plate. Orientation property is given by a known method, for example, by mechanical orientation treatment, such as rubbing or the like and optical orientation treatment or the like.

An alkali-free glass to be used for a liquid crystal cell is preferably used as a substrate glass. A resin film substrate is preferably used for the uses that require flexibility. The surface of the resin film may be orientation treated by rubbing or the like. Alternatively, an orientation film composed of other materials may be formed on the surface of the resin film.

While materials of the resin film used for the substrate are not particularly limited, only if the materials are resins having film forming properties, examples of the materials include stylene resins, (meta) acrylic acid resins, polyester resins, polyolefin resins, norbornene resins, polyimide resins, cellulose resins, polyvinyl alcohol resins, and polycarbonate resins or the like.

The casted liquid-crystalline coating fluid may be dried when necessary. While the drying method is not particularly limited, natural drying, reduced-pressure drying, drying by heating, and drying by heating under reduced pressure or the like may be used.

Any drying methods using a drying apparatus, such as an air circulation-type drying oven or heated rolls and the like are used as drying by heating means. The drying temperature in the case of drying by heating is preferably 50° C. to 120° C.

EXAMPLES

The present invention will be more clearly understood by referring to the Examples below. However, the Examples should not be construed to limit the invention in any way.

Example 1

A monoazo compound was obtained by diazonium salification of 3-amino-2,7-naphthalene disulfonic acid using sodium nitrite and hydrochloric acid and followed by coupling reaction with 5-amino-2-naphthalene sulfonic acid in an acidic cool temperature aqueous solution.

This monoazo compound was subject to diazonuim salification using sodium nitrite and hydrochloric acid and then was subject to coupling reaction with 5-amino-2-naphthol in a weakly basic cool water solution and was further subject to conversion into lithium salt from sulfonic acid salt to obtain an azo compound with the following structural formula (6).

[Chemical formula 6]

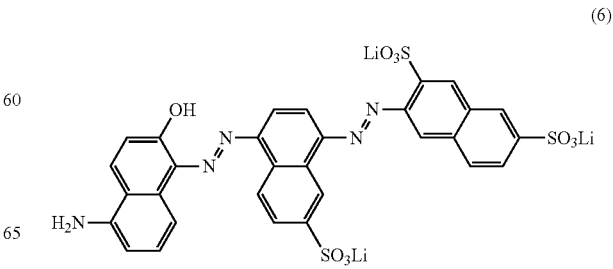

The aforementioned azo compound was dissolved in ion-exchange water and was adjusted so that the concentration of the azo compound might be 30% by weight. As a result, a liquid-crystalline coating fluid exhibiting a nematic liquid crystal phase was obtained. Ion-exchange water was further added to the liquid-crystalline coating fluid to adjust that the concentration of the azo compound might be 5% by weight to obtain a coating fluid.

The aforementioned coating fluid was cast by flowing on a surface of a norbornene polymer film (produced by Nippon Zeon Co., Ltd., product name "Zeonor") with rubbing treatment and corona treatment using a bar coater (produced by BUSCHMAN, product name "Mayer rot HS4") to obtain a polarizing film with a thickness of 0.4 μm by natural drying in a temperature-controlled room at 23° C. Table 1 shows a dichroic ratio of the obtained polarizing film.

TABLE 1

| | Chemical structural formula | Dichroic ratio |
|---|---|---|
| Example 1 | (6) | 30 |
| Example 2 | (7) | 18 |
| Example 3 | (8) | 14 |
| Example 4 | (9) | 13 |

TABLE 1-continued

| | Chemical structural formula | Dichroic ratio |
|---|---|---|
| Example 5 | (10) | 12 |

(Structure 10 shown in table)

Example 2

The azo compound of the following structural formula (7) was obtained by the method in the same manner as in Example 1 except for using 6-hydroxy-2-naphthonitrile instead of 5-amino-2-naphthol in Example 1.

[Chemical formula 7]

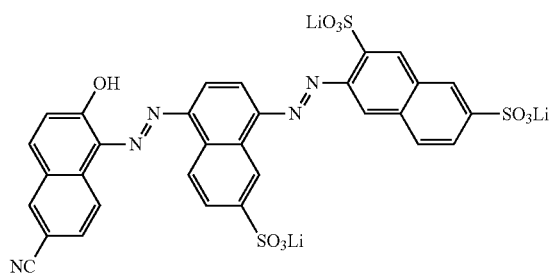

(7)

The aforementioned azo compound was dissolved in ion-exchange water to adjust so that the concentration of the azo compound might be 30% by weight. As a result, a liquid-crystalline coating fluid exhibiting a nematic liquid crystal phase was obtained. Ion-exchange water was further added to the liquid-crystalline coating fluid to adjust so that the concentration of the azo compound might be 5% by weight to obtain a coating fluid.

The aforementioned coating fluid was applied to the surface of a norbornene polymer film (produced by Nippon Zeon Co., Ltd., product name "Zeonor") with rubbing treatment and corona treatment using a bar coater (produced by BUS-CHMAN, product name "Mayer rot HS4") to obtain a polarizing film with a thickness of 0.4 μm by natural drying in a temperature-controlled room at 23° C. Table 1 shows a dichroic ratio of the obtained polarizing film.

Example 3

An azo compound of the following structural formula (8) was obtained in the same manner as in Example 1 except for using 8-amino-2-naphthalenesulfonic acid in place of 5-amino-2-naphthalenesulfonic acid and using 8-amino-2-naphthol in place of 5-amino-2-naphthol.

[Chemical formula 8]

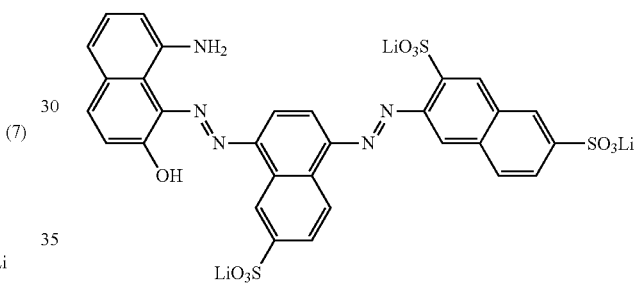

(8)

The aforementioned azo compound was dissolved in ion-exchange water to adjust so that the concentration of the azo compound might be 30% by weight. As a result, a liquid-crystalline coating fluid exhibiting a nematic liquid crystal phase was obtained. Ion-exchange water was further added to the liquid-crystalline coating fluid to adjust so that the concentration of the azo compound might be 5% by weight to obtain a coating fluid.

The aforementioned coating fluid was applied to the surface of a norbornene polymer film (produced by Nippon Zeon Co., Ltd., product name "Zeonor") with rubbing treatment and corona treatment using a bar coater (produced by BUS-CHMAN, product name "Mayer rot HS4") to obtain a polarizing film with a thickness of 0.4 μm by natural drying in a temperature-controlled room at 23° C. Table 1 shows a dichroic ratio of the obtained polarizing film.

Example 4

An azo compound of the following structural formula (9) was obtained by the method in the same manner as in Example 1 except for using 8-amino-2-naphthalenesulfonic acid in place of 5-amino-2-naphthalenesulfonic acid and using 6-amino-1,3-naphthtalenedisulfonic acid in place of 3-amino-2,7-naphthalenedisulfonic acid.

[Chemical formula 9]

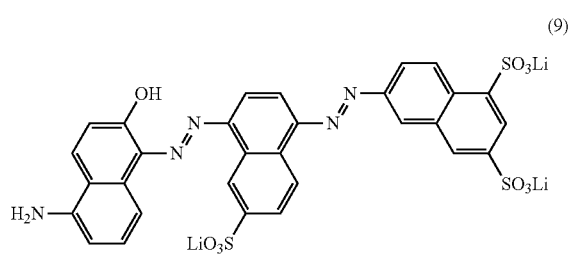

(9)

The aforementioned azo compound was dissolved in ion-exchange water to adjust so that the concentration of the azo compound might be 30% by weight. As a result, a liquid-crystalline coating fluid exhibiting a nematic liquid crystal phase was obtained. Ion-exchange water was further added to the liquid-crystalline coating fluid to adjust so that the concentration of the azo compound might be 5% by weight to obtain a coating fluid.

The aforementioned coating fluid was applied to the surface of a norbornene polymer film (produced by Nippon Zeon Co., Ltd., product name "Zeonor") with rubbing treatment and corona treatment using a bar coater (produced by BUSCHMAN, product name "Mayer rot HS4") to obtain a polarizing film with a thickness of 0.4 μm by natural drying in a temperature-controlled room at 23° C. Table 1 shows a dichroic ratio of the obtained polarizing film.

Example 5

An azo compound of the following structural formula (10) was obtained in the same manner as in Example 1 except for using 8-amino-2-naphthalenesulfonic acid in place of 5-amino-2-naphthalenesulfonic acid.

[Chemical formula 10]

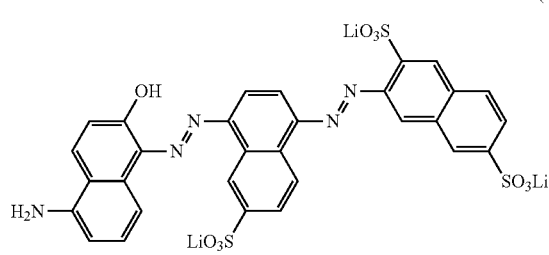

(10)

The aforementioned azo compound was dissolved in ion-exchange water to adjust so that the concentration of the azo compound might be 30% by weight. As a result, a liquid-crystalline coating fluid exhibiting a nematic liquid crystal phase was obtained. Ion-exchange water was further added to the liquid-crystalline coating fluid to adjust so that the concentration of the azo compound might be 5% by weight to obtain a coating fluid.

The aforementioned coating fluid was applied to the surface of a norbornene polymer film (produced by Nippon Zeon Co., Ltd., product name "Zeonor") with rubbing treatment and corona treatment using a bar coater (produced by BUSCHMAN, product name "Mayer rot HS4") to obtain a polarizing film with a thickness of 0.4 μm by natural drying in a temperature-controlled room at 23° C. Table 1 shows a dichroic ratio of the obtained polarizing film.

[Measurement Method]
[Observation of Liquid Crystal Phase]

A small quantity of the coating fluid was sandwiched by two pieces of slide glasses to observe using a polarization microscope (produced by Olympus, product name: "OPTIPHOT-POL") with a large-size sample heating and cooling stage (produced by JAPAN HIGH TECH CO., LTD., product name: "10013L").

[Measurement of Dichroic Ratio]

Measuring light of linear polarization (produced by JASC Corporation; product name: V-7100) was allowed to enter using a spectrophotometer with Glan-Thompson polarizer. And $k_1$ and $k_2$ of Y value whose visibility had been corrected were obtained to calculate a dichroic ratio from the following equation:

$$\text{Dichroic ratio} = \log(1/k_2)/\log(1/k_1)$$

wherein $k_1$ is a transmittance of a linear polarization in a maximum transmittance direction and $k_2$ is a transmittance of a linear polarization in a direction that is perpendicular to the maximum transmittance direction.

INDUSTRIAL APPLICABILITY

The polarizing film of the present invention is preferably used as a polarizing element. A polarizing element is preferably used for liquid crystal panels for a variety of devices, such as liquid crystal panels, such as liquid crystal television units, computer displays, mobile phones, digital cameras, video cameras, portable game devices, and car navigation systems or the like.

The polarizing film of the present invention may be released from the substrate. Alternatively, the polarizing film may be used while remaining laminated on the substrate. In the case where the polarizing film is used for optical uses while remaining laminated on the substrate, the substrate is preferably transparent to visible light. In the case where the polarizing film is released from the substrate, the polarizing film is preferably used while being laminated on other support or optical elements.

What is claimed is:
1. A liquid-crystalline coating fluid comprising:
an azo compound represented by the following general formula (1); and
a solvent to dissolve the azo compound:

[Chemical formula 1]

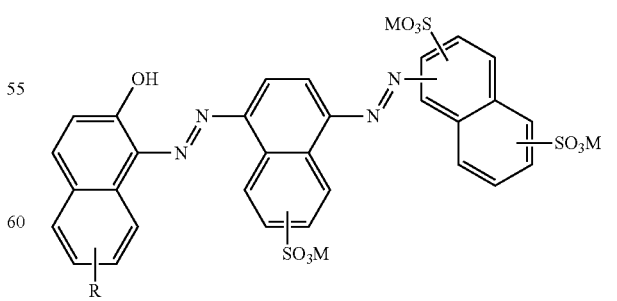

(1)

wherein R is an amino group, a cyano group, a hydroxyl group, a nitro group, a halogen group or a hydrogen atom; and M is a counterion.

2. A liquid-crystalline coating fluid comprising:
an azo compound represented by the following general formula (2); and
a solvent to dissolve the azo compound:

[Chemical formula 2]

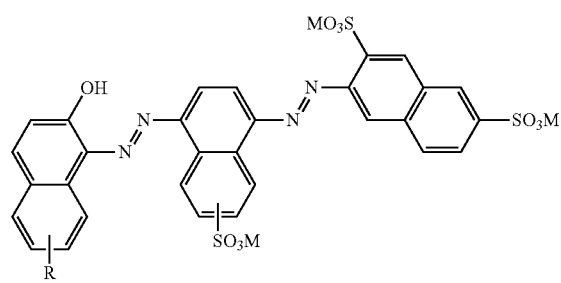

(2)

wherein R is an amino group, a cyano group, a hydroxyl group, a nitro group, a halogen group or a hydrogen atom; and M is a counterion.

3. A liquid-crystalline coating fluid comprising:
an azo compound represented by the following structural formula (6); and
a solvent to dissolve the azo compound

[Chemical formula 6]

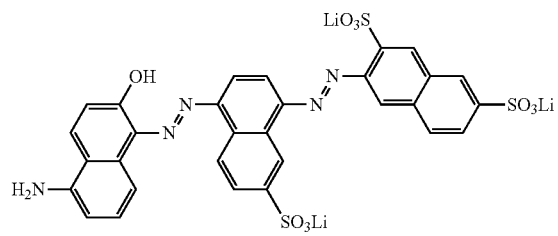

(6)

4. A polarizing film obtained by casting the liquid-crystalline coating fluid according to claim 1 in a thin film state.

5. A polarizing film obtained by casting the liquid-crystalline coating fluid according to claim 2 in a thin film state.

6. A polarizing film obtained by casting the liquid-crystalline coating fluid according to claim 3 in a thin film state.

* * * * *